(12) United States Patent
Tuomi

(10) Patent No.: US 8,471,862 B2
(45) Date of Patent: Jun. 25, 2013

(54) OFFSET TILES IN VECTOR GRAPHICS

(75) Inventor: Mika Tuomi, Noormarkku (FI)

(73) Assignee: ATI Technologies ULC, Markham, Ontario (CA)

( * ) Notice: Subject to any disclaimer, the term of this patent is extended or adjusted under 35 U.S.C. 154(b) by 869 days.

(21) Appl. No.: 11/684,428

(22) Filed: Mar. 9, 2007

(65) Prior Publication Data

US 2008/0218521 A1    Sep. 11, 2008

(51) Int. Cl.
*G09G 5/00*    (2006.01)

(52) U.S. Cl.
USPC ........... 345/581; 345/506; 345/441; 345/684; 382/166; 382/232

(58) Field of Classification Search
USPC ............................ 345/418–689; 382/232, 166
See application file for complete search history.

(56) References Cited

U.S. PATENT DOCUMENTS

| | | | |
|---|---|---|---|
| 6,407,736 B1 * | 6/2002 | Regan | 345/422 |
| 6,597,363 B1 * | 7/2003 | Duluk et al. | 345/506 |
| 6,611,272 B1 * | 8/2003 | Hussain et al. | 345/531 |
| 6,674,443 B1 * | 1/2004 | Chowdhuri et al. | 345/557 |
| 6,714,196 B2 * | 3/2004 | McCormack et al. | 345/423 |
| 6,768,487 B1 * | 7/2004 | Greene et al. | 345/422 |
| 6,825,847 B1 * | 11/2004 | Molnar et al. | 345/555 |
| 6,975,318 B2 * | 12/2005 | Junkins et al. | 345/423 |
| 7,023,437 B1 * | 4/2006 | Voorhies et al. | 345/420 |
| 7,120,311 B2 * | 10/2006 | Snyder | 382/276 |
| 7,301,549 B2 * | 11/2007 | Damera-Venkata | 345/698 |
| 7,382,368 B1 * | 6/2008 | Molnar et al. | 345/421 |
| 2002/0063717 A1 * | 5/2002 | Minner et al. | 345/557 |
| 2003/0076325 A1 * | 4/2003 | Thrasher | 345/443 |
| 2003/0076331 A1 * | 4/2003 | Deering | 345/581 |
| 2003/0179208 A1 * | 9/2003 | Lavelle | 345/539 |
| 2003/0218614 A1 * | 11/2003 | Lavelle et al. | 345/539 |
| 2003/0234792 A1 * | 12/2003 | Junkins et al. | 345/582 |
| 2004/0100471 A1 * | 5/2004 | Leather et al. | 345/506 |
| 2005/0093876 A1 * | 5/2005 | Snyder et al. | 345/582 |
| 2005/0225571 A1 * | 10/2005 | Collins et al. | 345/660 |
| 2005/0264554 A1 * | 12/2005 | Deming | 345/418 |
| 2005/0270311 A1 * | 12/2005 | Rasmussen et al. | 345/677 |
| 2005/0285850 A1 * | 12/2005 | Heim et al. | 345/418 |
| 2006/0103665 A1 * | 5/2006 | Opala et al. | 345/619 |
| 2006/0197999 A1 * | 9/2006 | Murakami | 358/538 |
| 2007/0146378 A1 * | 6/2007 | Sorgard et al. | 345/581 |
| 2008/0247641 A1 * | 10/2008 | Rasmusson et al. | 382/166 |
| 2008/0273032 A1 * | 11/2008 | Brennan | 345/421 |

* cited by examiner

*Primary Examiner* — Said Broome
*Assistant Examiner* — Abderrahim Merouan
(74) *Attorney, Agent, or Firm* — Faegre Baker Daniels LLP

(57) ABSTRACT

An efficient rendering method for processing computer graphics in tiles. First a frame of data, typically at least one polygon, is received for rendering. While rendering a polygon the tile for the polygon is assigned so that it minimizes the number of the tiles needed for processing the polygon. It is possible to compute an offset value between the static tiles and the assigned tiles. If the offset value is computed, the rendering into an actual screen may be based on that.

20 Claims, 4 Drawing Sheets

OFFSET TILES IN VECTOR GRAPHICS

FIELD OF THE INVENTION

The invention relates to vector graphics rendering.

BACKGROUND OF THE INVENTION

Recently resolutions in computer graphics have grown enormously. The better resolutions are needed for providing better image quality for different application types, such as games, web applications and alike. Typically vector graphics are produced so that pixels in the screen are divided into sub-pixels having a set of samples for computing the coverage value of the pixel if an edge of a vector graphics polygon overlaps the pixel. Typically this requires more memory for each pixel than the frame buffer comprising the actual rendered image.

Recently mobile devices, such as PDA's and mobile phones have been enabled with multimedia features. This has created a need for enhanced graphics. For example, modern World Wide Web services include Macromedia Flash content that is an example of vector graphics content. A common user using a web service does not even know how the image is produced. However, an impressive graphics experience requires resource demanding functionality and it is obvious that service providers are producing more and more impressive services in the future. The problem of this is that the current mobile devices do have limited resources that cannot provide fluent operation of applications in all conditions. The problem could be solved by introducing more powerful processors and larger memories into mobile devices. However, this leads to an increased size and energy consumption. Thus, this is not desirable as the users want smaller devices having long standby and operating times. Furthermore, there is a plurality of possible features competing from the same resources.

In order to reduce memory requirements in graphics processing a method using tiles has been introduced. In tiling methods the at least portion of the screen or the frame to be displayed is divided into tiles and the tiles are then processed sequentially so that a buffer for storing sub-pixel information needs to be allocated only for the tile size. The tiles are fixed statically to certain locations so that there is no need for extra logic. Then, the graphics processor needs to resolve which polygons need to be processed that fall within the current tile. After resolving the polygons that fall within (or "hit") the tile are computed and rendered. Once all the polygons have been processed the tile is ready and the processing may be continued in the next tile.

The problem of the tiling as described above is that the objects to be rendered typically hit on a plurality of tiles. Thus, the same polygon may have to be processed again for each tile it hits. For example, an object may hit up to four tiles (or more) as a result of the object crossing the boundaries between tiles and the processing of the polygon needs to be done multiple (e.g., four) times instead of in one single pass. Thus, there is a need for a method and device for providing efficient rendering while maintaining the low memory consumption.

SUMMARY

The present invention discloses an efficient rendering method for processing vector graphics in tiles. First a frame of data comprising a plurality of objects, which are typically polygons, is received for rendering. Then the polygons must be resolved in order to know which tiles they hit. While rendering a polygon the location of the tile for the polygon is altered so that it minimizes or reduces the number of the tiles needed for processing the polygon as compared to the situation when the tile location was fixed. It is possible to compute an offset value between the static tiles and assigned tiles. If the offset value is computed, the rendering to actual screen may be based on that the processed polygon and the computed offset value.

The present invention may be implemented as a functional block for a graphics processor. The block includes a frame buffer for actual image, a tile buffer for tile specific information and a processor or other code execution means configured to perform the processing according to the invention. In an embodiment the present invention is implemented as a graphics processor.

The benefit of the present invention is that it is capable of processing some polygons in fewer tiles than a conventional method which uses fixed tile locations. This may reduce the number of computations and may lead to more efficient rendering. This may enable reduced computing power requirements or may allow for enhanced quality with the same computing power.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Reference will now be made in detail to the embodiments of the present invention, examples of which are illustrated in the accompanying drawings.

Figure 1A:
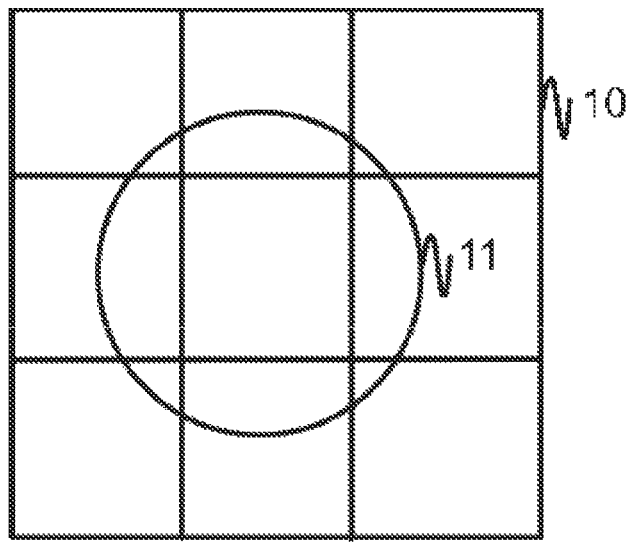
FIG. 1 is an example of the rendering process according to the present invention.

In FIG. 1 an example of the rendering process according to an embodiment of the present invention is disclosed. The purpose of FIG. 1 is to explain the basic setting causing the need for the present invention and how the solution according to the present invention is beneficial compared to conventional art without offset tiling. In FIG. 1a tile grid 10 is illustrated. The tile grid 10 covers a portion of the actual screen shown to the user of the device having a graphics display. The number of the tiles depends on the screen size and other parameters that relate to memory usage. A polygon 11 is then rendered into the screen. In the example of FIG. 1 the polygon is an unfilled circle. Naturally the polygon 11 can be replaced with any other polygon with different shape and fill properties. It can be seen that the circle hits eight tiles, which is all except the one in the middle. If the polygon was a filled circle, the figure would hit all nine tiles.

Figure 1B:
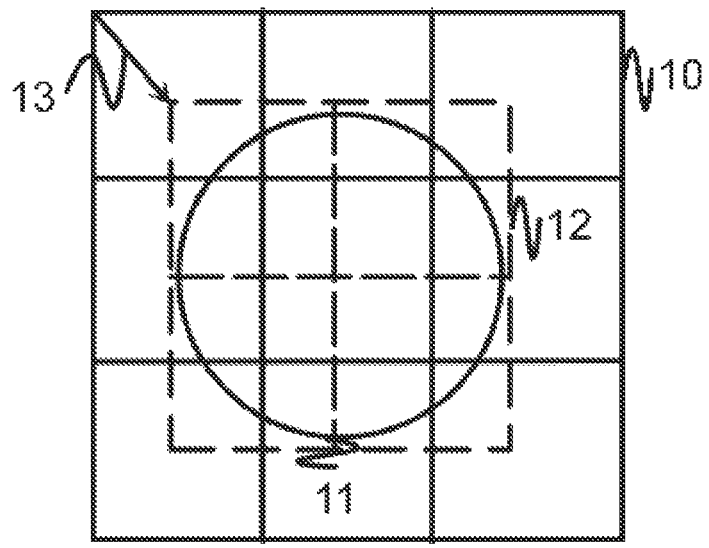

FIG. 1b shows a similar situation with tile grid 10 and polygon 11. However, in FIG. 1b the offset tiling concept according to the present embodiment is used. The system according to the present embodiment detects that the polygon 11 does not hit as few tiles as possible but uses eight tiles instead of four tiles. Thus, a system according to the present embodiment generates new tiles for the polygon 11 by moving the first tile that the object hits. Then an offset 13 can be computed. The offset 13 is the difference between the original tile 10 and the offset tile 12. From FIG. 1b it can be seen that the circle 11 is now covered by only four offset tiles 12.

Figure 2:
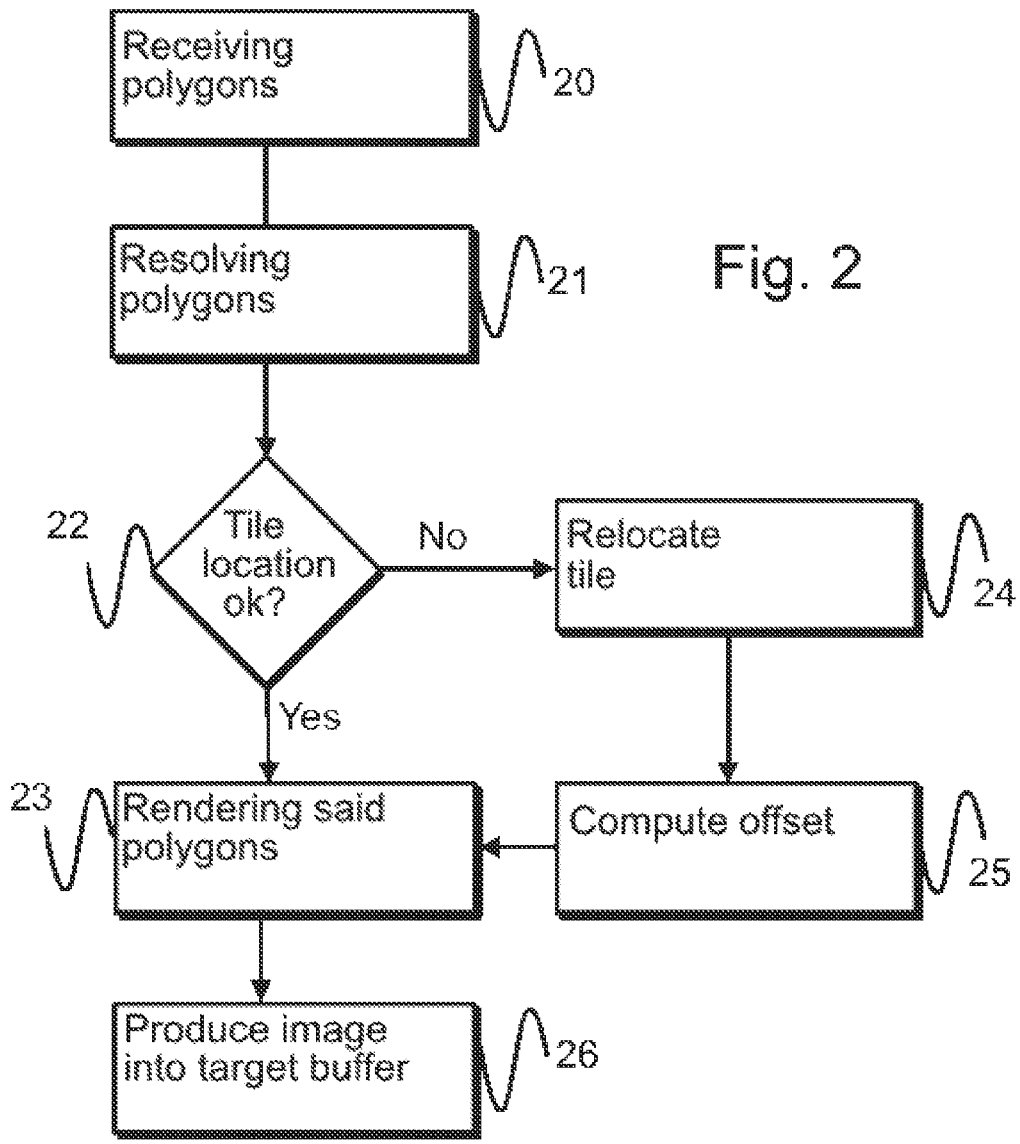
FIG. 2 is a flow chart of an example embodiment of the present invention.

FIG. 2 discloses a flow chart of an example embodiment according to the present invention. The example of FIG. 2 uses a scene-tiling method, wherein the whole screen is divided into tiles. The method is initiated by receiving graphic objects, typically polygons, to be rendered, such as the circle in FIG. 1, step 20. The received polygons must be resolved in order to know which tiles the received polygons hit, step 21. In the rendering process according to the present embodiment the location of the tile is first checked, step 22. If the tile is located so that the number of the used tiles could be reduced, the tile can be relocated, step 24. Then an offset can be computed, step 25. Then polygons are rendered with the computed offset, step 23. If the tile is correctly located, it can be rendered directly, step 23. Finally the actual image is produced into the frame buffer, step 26.

The offset and relocating may be done in several different but equally functioning ways. For example, it is possible to compute first the offset and then move the tile for processing. Furthermore, it is possible to compute the offset to a tiled screen or to a complete screen so that the screen is not actually tiled but temporary tiles are used for rendering each object. The relocated tile may be relocated, for example, by using the leftmost x-coordinate and the topmost y-coordinate of the object as borders. However, it is common to all embodiments of the invention that the tiles are located so that the received vector graphics object can be rendered by using a reduced number of tiles if possible.

Figure 3:
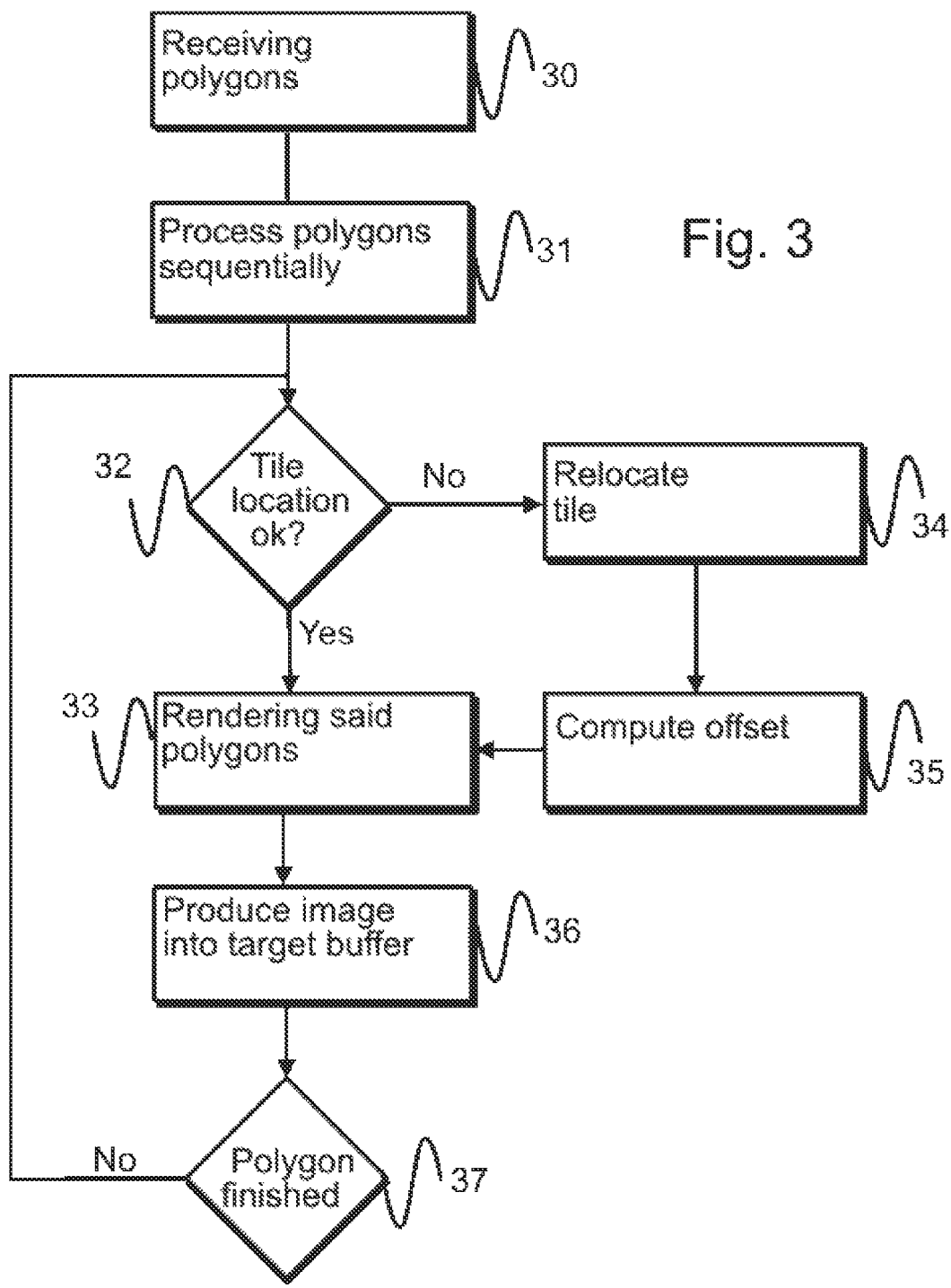
FIG. 3 is a block diagram of an example embodiment of the present invention.

FIG. 3 discloses a flow chart of an example embodiment according to the present invention. The example of FIG. 3 uses an object-tiling method, wherein the object to be rendered is divided into tiles. The method is initiated by receiving polygons or other vector objects, such as the circle in FIG. 1, step 30. In the object-tiling method the polygons are not be resolved but they are processed sequentially, step 31. In the rendering process according to the present invention the location of the tile is first checked, step 32. If the tile is not optimally located, the tile can be relocated, step 34. Then an offset can be computed, step 35. In this case the offset is the relation ship between the tile and the frame buffer. Then polygons are rendered with the computed offset, step 33. If the tile is correctly located, it can be rendered directly, step 33. Finally the actual image is produced into the frame buffer, step 36. At this stage the present tile for the present object is ready; however, the whole object might not be rendered yet. Thus, it must be checked that if there are further tiles for the present object. If the object is not ready, the process continues with the next tile, step 37.

Figure 4:
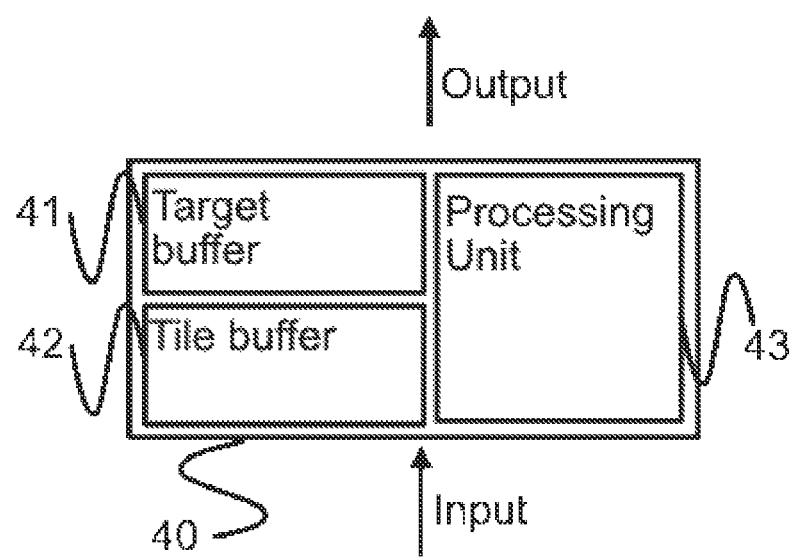
FIG. 4 is a block diagram of an example embodiment of the present invention.

In FIG. 4 a block diagram of an example embodiment according to the present invention is disclosed. FIG. 4 represents a graphics block 40 comprising a frame buffer 41, a tile buffer 42 and a processing unit 43. The processing unit might the processing unit of the host component, such as a graphics processor. The frame buffer 11 is used for producing the actual image that will be shown on the display of the device into which the graphics processor according to the present invention is installed. The tile buffer 42 is configured to store tile-related information, such as sub-pixel information for each pixel within the tile. The tile buffer is used for storing the offset tile contents.

A person skilled in the art recognizes that the present invention may be co-operating with other blocks of the host component as the producing of the whole image requires different phases and the present invention discloses an improvement to the rendering phase.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method for processing a frame of data electronically, or portion thereof, for display, said method for processing comprising:
   processing a plurality of objects, wherein each of the plurality of objects is comprised of a plurality of polygons, within said frame of data in a plurality of tiles each of said tiles having a location within said frame, wherein for each object:
   resolving polygons comprising the object to obtain a location of at least one tile of said plurality of tiles, wherein the polygons fall within the at least one tile; and
   altering the location of the at least one tile by moving the at least one tile based on computing an offset: and
   rendering said polygons to produce the objects for display, wherein the number of tiles used during the processing of said object is reduced responsive to said altering as compared to processing said received polygon without said altering.

2. The method according to claim 1, wherein the method further comprises dividing said frame into tiles.

3. The method according to claim 1, wherein the method further comprises assigning a set of tiles for said object individually.

4. The method according to claim 3, wherein said assigning comprises computing the offset for static tiles.

5. The method according to claim 4, wherein rendering said polygons comprises rendering said objects into screen space using said offset.

6. The method according to claim 1, wherein the method comprises rendering said polygons in sequential order.

7. The method according to claim 1, wherein the method comprises assigning tiles for each polygon individually.

8. A rendering block for a graphics device comprising:
   a pipeline configured to receive a frame of data;
   a frame buffer;
   a tile buffer; and
   a processor configured to receive and render said frame of data comprising a plurality of objects, wherein each of the plurality of objects is comprised of a plurality of polygons, into said
   frame buffer, wherein for each object said processor is further configured to:
   resolve polygons comprising the object to obtain a location of at least one tile of said plurality of tiles, wherein the polygons fall within the at least one tile;
   alter the location of the at least one tile by moving the at least one tile based on computing an offset; and
   render said polygons to produce the objects for display, wherein the number of tiles used during the processing of said object is reduced responsive to said altering as compared to processing said received polygon without said altering.

9. The rendering block according to claim 8, wherein said processor is configured to compute the offset between static tiles and assigned tiles.

10. The rendering block according to claim 9, wherein said processor is configured to render said frame of data into a screen using said offset.

11. The rendering block according to claim 8, wherein said processor is a processor of a host component.

12. The rendering block according to claim 8, wherein the rendering block is configured to render said objects in sequential order.

13. The rendering block according to claim 8, wherein the rendering block is configured to assign tiles for each object individually.

14. A graphics processor comprising:
  a pipeline configured to receive a frame of data;
  a frame buffer;
  a tile buffer; and
    processing means configured to receive and render said frame of data comprising a plurality of objects, wherein each of the plurality of objects is comprised of a plurality of polygons, into said frame buffer, wherein for each object said processor is further configured to:
    resolve polygons comprising the object to obtain a location of at least one tile of said plurality of tiles, wherein the polygons fall within the at least one tile;
    alter the location of the at least one tile by moving the at least one tile based on computing an offset; and
    render said polygons to produce the objects for display, wherein the number of tiles used during the processing of said object is reduced responsive to said altering as compared to processing said received polygon without said altering.

15. The graphics processor according to claim 14, wherein said processing means are configured to compute the offset between static tiles and assigned tiles.

16. The graphics processor according to claim 14, wherein said processing means are configured to render said polygons into a screen using said offset.

17. The graphics processor according to claim 14, wherein the rendering block is configured to render said objects in sequential order.

18. The graphics processor according to claim 14, wherein the rendering block is configured to assign tiles for each object individually.

19. The graphics processor according to claim 14, wherein the graphics processor is configured to render said objects into screen using said offset.

20. A method for processing a frame of data electronically, or portion thereof, for display, said method dividing said frame into a plurality of tiles each of said plurality of tiles having a location within said frame, said method for processing comprising: for a received polygon:
  resolving the polygon to obtain a location of at least one tile of said plurality of tiles, wherein the polygon falls within the at least one tile; and
  altering the location of the at least one tile by moving the at least one tile based on computing an offset; and
  processing said received polygon wherein the number of tiles used during the processing of said received polygon is reduced responsive to said altering as compared to processing said received polygon without said altering.

* * * * *